March 2, 1937. A. CLAUD-MANTLE 2,072,119
AUTOMOBILE ROBE SUPPORT AND BRACKET THEREFOR
Filed Aug. 26, 1935
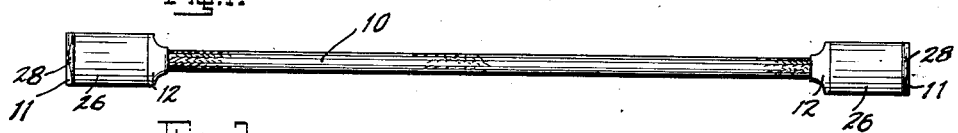
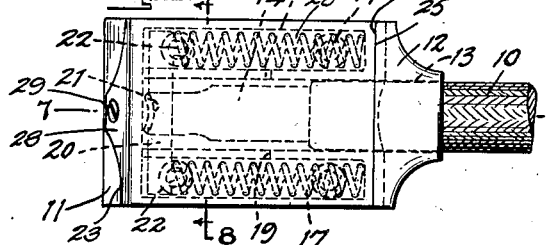
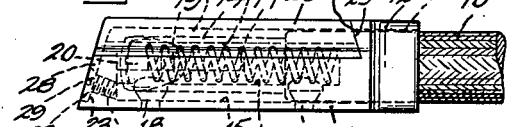
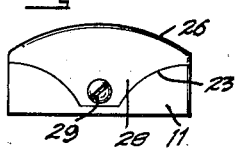
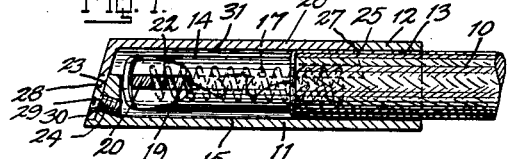
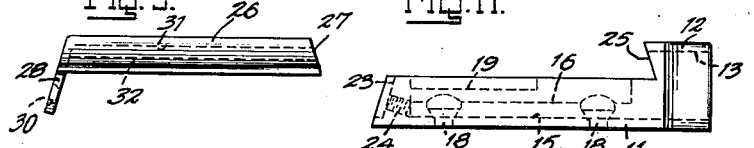
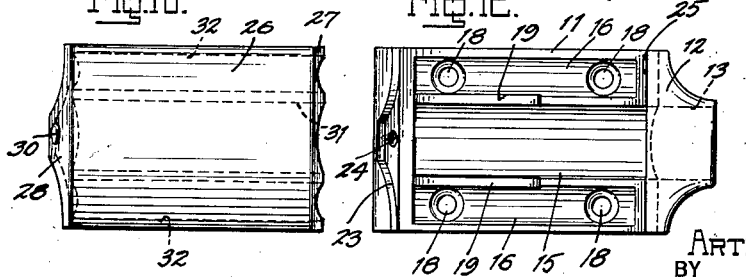
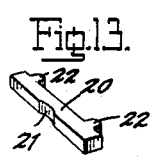
INVENTOR
ARTHUR CLAUD-MANTLE.
BY
ATTORNEY Patented Mar. 2, 1937

2,072,119

UNITED STATES PATENT OFFICE 2,072,119

AUTOMOBILE ROBE SUPPORT AND BRACKET THEREFOR

Arthur Claud-Mantle, Trumbull, Conn., assignor to The Bassick Company, Bridgeport, Conn., a corporation of Connecticut Application August 26, 1935, Serial No. 37,793

5 Claims. (Cl. 24—123)

The present invention relates to an improved automobile robe support and bracket therefor, and has for an object to provide a robe support having a flexible non-elastic cord and attaching brackets receiving the ends of the cord, and spring means within the brackets exerting outward pressure upon the ends of the cord whereby the same will remain at all times taut, and when it is desired to support a robe or garment thereon it may be extended to receive the robe or garment and will then retain the same under spring pressure. A further object is to provide a bracket of simple and inexpensive construction in which a base portion is adapted to be secured to the seat back prior to the assembly of the cord and spring means, and after the assembly of the cord and spring means a cover portion is adapted to be secured in place in a manner to completely conceal the attaching screws, thus providing a smooth and attractive outer surface. Another object is to provide a construction in which a pair of springs will be provided at each side of the end of the cord so that relatively small springs may be employed while at the same time sufficient pressure is provided to retain the cord taut and to resist pull thereon, the construction at the same time permitting of a compact flat bracket structure. Another object is to provide a bracket in which the resilient action is limited to a predetermined extent whereby excess pressure will be transmitted to a solid support and not exerted upon the spring means.

With the above and other objects in view, an embodiment of the invention is shown in the accompanying drawing, and this embodiment will be hereinafter more fully described with reference thereto and the invention will be finally pointed out in the claims.

In the drawing:

Fig. 1 is a front elevation showing a robe rail and end brackets, according to my invention.

Fig. 2 is a plan view thereof, the dot-and-dash lines showing the extended position of the cord.

Fig. 3 is a front elevation of one bracket provided at one end of the robe rail, the bracket at the other end being of identical construction.

Fig. 4 is a side elevation thereof.

Fig. 5 is an inner end elevation.

Fig. 6 is an outer end elevation.

Fig. 7 is a longitudinal sectional view, taken along the line 7—7 of Fig. 3.

Fig. 8 is a transverse sectional view, taken along the line 8—8 of Fig. 3.

Fig. 9 is a side elevation of the cover portion of the bracket in separated relation.

Fig. 10 is a plan view thereof.

Fig. 11 is a side elevation of the base portion of the bracket.

Fig. 12 is a plan view thereof.

Fig. 13 is a perspective view of the spring pressure bar employed.

Similar reference characters indicate corresponding parts throughout the several figures of the drawing.

Referring to the drawing, the exemplary illustrated embodiment of the invention shown therein comprises a flexible non-elastic cord member 10 slidably and resiliently connected at its ends within brackets which are secured to the back of the automobile seat. Inasmuch as these brackets are of identical construction only one will be described in detail.

The bracket comprises a casing consisting of a base member 11 provided at its inner end with a raised portion 12 having a cylindrical passage 13 therethrough for receiving the cord 10, the cord being provided at its end with an eye clip member 14, this member being of well known construction and being tightly clipped about the end of the cord. The base member is provided along its central portion with a substantially semi-cylindrical channel 15 continuously formed with the cylindrical passage 13 and forming a pocket within which the end of the cord has sliding movement. At each side of the channel 15 there are provided substantially semi-cylindrical channels 16—16 for receiving the springs 17—17, countersunk screw holes 18 being provided in the bases of the channels 16—16 for the purpose of securing the base member to the automobile seat back by means of screws. The walls between the channel 15 and the channels 16—16 are provided adjacent the outer wall of the base with recesses 19—19, which, when the cover member is in place, as will presently more fully appear, form longitudinal slots in which the spring pressure bar 20 has sliding movement.

This spring pressure bar 20 is provided centrally of its rearward surface with a recess 21 in which the eye of the clip 14 seats, and upon its forward surface lugs 22—22 are provided near each end which engage within the outer ends of the springs 17—17. The springs are under compression and exert pressure upon the bar 20 to pull the cord in the direction of the bracket.

The outer wall of the base, which is downwardly and outwardly inclined, is provided with a recess 23 having arcuately formed downwardly converging side walls, a threaded screw hole 24 being provided within the recess near the bottom of the wall.

The rearward surface 25 of the forward portion 12 of the base is forwardly and inwardly inclined, for the purpose of interlockingly receiving the forward end of the cover member, as will presently more fully appear.

The cover member 26 is provided with a downwardly and outwardly inclined forward end surface 27 adapted to interlockingly engage the surface 25 of the base, and at its rearward end is provided with a downwardly and outwardly inclined flange 28 adapted to fit into the recess 23 of the base in flush relation, being secured therein by means of a set-screw 29 engaged in a countersunk hole 30 in the flange and screwed into the threaded hole 24 of the base.

The under surface of the cover member is provided centrally with a longitudinally extending substantially semi-cylindrical channel 31, which is complementary to the channel 15 of the base, and with it completes a longitudinally extending cylindrical passage in continuation of the cylindrical passage 13, and within which the cord end is disposed and has sliding movement. At each side of the channel 31 there are provided substantially semi-cylindrical channels 32—32 which are complementary to the channels 16—16 of the base and with them form cylindrical passages in which the springs 17—17 are housed. The walls between the channel 31 and the channels 32—32 seat upon the walls between the channel 15 and the channels 16—16 of the base and form with the recesses 19—19 slots in which the spring pressure bar 20 is disposed and retained for sliding movement.

It will be seen that the construction, according to the invention, permits the base members 11 of the two end brackets to be secured to the automobile seat back before assembly of the cord ends, springs, and spring pressure bars, and therefore without the inconvenience of securing the bases while the connecting cord between them is under tension. Thereupon the cord ends and springs are assembled and the cover members secured in place, the latter operation being accomplished simply by fastening the set-screws 29. The attaching screws of the base are completely concealed and protected against tampering and the cover presents a smooth attractive outer surface.

In operation the springs within the brackets at each end of the cord are normally under tension, so that the cord is at all times taut. Upon extension of the cord, as shown in dot-and-dash lines in Fig. 2, further tension is applied to the springs, and any articles hung upon the cord will be securely held under spring pressure. When the cord is extended to its limit the spring pressure bar 20 abuts the ends of the recesses 19—19, and further pull thereon is therefore transmitted directly to the casing, so that excessive strain will not be exerted upon the springs.

I have illustrated and described a preferred and satisfactory embodiment of the invention, but it will be obvious that changes may be made therein, within the spirit and scope thereof, as defined in the appended claims.

Having thus described my invention, what I claim and desire to secure by Letters Patent is:—

1. A bracket for an automobile robe support comprising a casing adapted to receive the end member of a robe supporting cord, spring means arranged in said casing to act between said end member and said casing to normally draw said cord toward said bracket, said casing comprising a base member adapted to be secured to a seat back or the like, before assembly of said cord, and a cover member adapted to be secured to said base after assembly of said cord to retain said cord in assembled relation.

2. A bracket for an automobile robe support comprising a casing adapted to receive the end member of a robe supporting cord, spring means arranged in said casing to act between said end member and said casing to normally draw said cord toward said bracket, said casing comprising a base member adapted to be secured to a seat back or the like before assembly of said cord, said base having a cord receiving passage open at one side and a cover member adapted to be secured to said base after assembly of said cord to close the open side of said passage to retain said cord in assembled relation.

3. A bracket for an automobile robe support comprising a casing adapted to receive the end member of a robe supporting cord, spring means arranged in said casing to act between said end member and said casing to normally draw said cord toward said bracket, said casing comprising a base member adapted to be secured to a seat back or the like, before assembly of said cord, said base having a cord receiving passage open at one side and a spring receiving passage open at one side, and a cover member adapted to be secured to said base after assembly of said cord and spring means to close the open sides of said passages to retain said cord and spring means in assembled relation.

4. A bracket for an automobile robe support, comprising a casing adapted to receive the eye clip member of a robe supporting cord, a cross piece engaged through the eye of said clip member and projecting at each side, and a pair of compression springs, one at each side of said clip member, respectively disposed between the projecting ends of said cross piece and said casing to normally draw said cord toward said bracket, said casing comprising a base member adapted to be secured to a seat back or the like, before assembly of said cord and springs, said base having a cord receiving passage open at one side, spring receiving passages at each side of said cord receiving passage open at one side, and recesses in the walls between said passages, also open at one side and adapted to receive said cross piece, and a cover member adapted to be secured to said base after assembly of said cord, springs and cross-piece to close the open sides of said passages and recesses to retain said cord, springs and cross-piece in assembled relation.

5. A bracket for an automobile robe support comprising a casing adapted to receive the end member of a robe supporting cord, spring means arranged in said casing to act between said end member and said casing to normally draw said cord toward said bracket, said casing comprising a base member adapted to be secured to a seat back or the like before assembly of said cord, said base having a cord receiving passage open at one side and a shouldered portion at one end of said passage having a cylindrical cord receiving passage, and a cover member adapted to be secured to said base after assembly of said cord to close the open side of said passage to retain said cord in assembled relation, said cover being interlockingly engaged at one end with said shouldered portion.

ARTHUR CLAUD-MANTLE.